(12) United States Patent
Park et al.

(10) Patent No.: US 9,203,948 B2
(45) Date of Patent: Dec. 1, 2015

(54) MOBILE TERMINAL AND CONTROLLING METHOD THEREOF

(75) Inventors: Hyesuk Park, Seoul (KR); Jaehwang Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 451 days.

(21) Appl. No.: 13/045,340

(22) Filed: Mar. 10, 2011

(65) Prior Publication Data
US 2011/0244845 A1    Oct. 6, 2011

(30) Foreign Application Priority Data
Mar. 31, 2010    (KR) .................. 10-2010-0029252

(51) Int. Cl.
*G06F 15/16*    (2006.01)
*H04M 1/725*    (2006.01)

(52) U.S. Cl.
CPC ...... *H04M 1/72552* (2013.01); *H04M 1/72525* (2013.01)

(58) Field of Classification Search
CPC ..... G06Q 10/107; H04L 12/585; H04L 12/58
USPC ........................................ 709/206, 227, 237
See application file for complete search history.

(56) References Cited

U.S. PATENT DOCUMENTS

| 2003/0172077 | A1* | 9/2003 | Moussavian ................. 707/100 |
| 2004/0176134 | A1* | 9/2004 | Goldthwaite et al. ........ 455/558 |
| 2005/0027716 | A1* | 2/2005 | Apfel ............................ 707/100 |
| 2005/0181785 | A1* | 8/2005 | Chen et al. .................... 455/428 |
| 2006/0190569 | A1* | 8/2006 | Neil et al. ..................... 709/220 |
| 2006/0258394 | A1* | 11/2006 | Dhillon et al. ............. 455/552.1 |
| 2008/0057942 | A1* | 3/2008 | Woods et al. ................. 455/425 |
| 2008/0294731 | A1* | 11/2008 | Roy ............................. 709/206 |
| 2009/0075641 | A1 | 3/2009 | Guven et al. |
| 2010/0041441 | A1* | 2/2010 | Kato et al. .................... 455/566 |

FOREIGN PATENT DOCUMENTS

WO    WO 2008/153416 A1    12/2008

* cited by examiner

*Primary Examiner* — Philip Chea
*Assistant Examiner* — Van Kim T Nguyen
(74) *Attorney, Agent, or Firm* — Birch, Stewart, Kolasch & Birch, LLP (57) ABSTRACT

The present invention includes a mobile terminal and controlling method including a wireless communication unit configured to externally exchange a wireless signal, a display unit, and a controller, when a text message is received from a text message server via the wireless communication unit, configured to determine whether application update data for updating information of a specific application is included in the received text message and whether an indictor indicating a type of the specific application is included in the received text message, to update the information of the specific application indicated by the indicator if the indicator is included in the received text message, and to control the updated information to be displayed on the display unit.

15 Claims, 8 Drawing Sheets

```
News
  << news, title >>detail information

Category
        - news [string] : lower case
      Element
        - title [string] : news title
```
(a)

```
Weather
  << weather, weather icon index, temperature, humidity >>detail information Category
        - weather [string] : lower case
      Element
        - weather icon index [number] : predefined weather icon (ex. 1: SUN, 2: CLOUD, 3: RAIN)
        - temperature [number]
        - humidity [number]
```
(b)

```
Description
      - Category: news, weather (it can be defined more)
      - Prefix is delimited by "<< >>".
      - Prefix is only lower case and there is no space. (except title element in news category)
      - Element is delimited by ",".
      - Prefix max length: SMS 1 page, Total data max length: SMS 6 pages
```
(c)

FIG. 5A

| Display |
|---|
| 1. Wallpaper |
| 2. Backlinght timer |
| 3. Brightness |
| 4. Contrast |
| 5. Home screen shortcut |
| 6. Widget Indicator |
| 7. Network name |
| OK          Back |

510

| Widget Indicator |
|---|
| Service list |
| ● Weather |
| ☐ News |
| ● Sports |
| ● Stock |
| ☐ Event |

520

(a)                (b)

| Widget Indicator |
|---|
| Service list |
| 1. Weather |
| 2. News |
| 3. Sports |
| 4. Stock |
| 5. Event |

| News |
|---|
| 1. On        ✓ |
| 2. Off |
| |
| OK        Back |

MOBILE TERMINAL AND CONTROLLING METHOD THEREOF

Pursuant to 35 U.S.C. §119(a), this application claims the benefit of earlier filing date and right of priority to Korean Application No. 10-2010-0029252, filed on Mar. 31, 2010, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for updating information on an application via a text message.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and, the like for example.

To support and increase of the terminal functions, it may be able to consider the improvement of structural parts and/or software parts of the terminal.

Recently, as a wireless internet function and/or a data packet communication function is implemented in a mobile terminal, application information (e.g., widget information) is updated via the wireless internet and/or data packet communication function.

However, such a communication function is limited by a place and a fee of use and can be implemented in a relatively expensive terminal. Therefore, the demand for a method of updating application information in a simpler and convenient manner is rising.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which information displayed on various applications can be efficiently and conveniently updated.

Another object of the present invention is to provide a mobile communication system and controlling method thereof, by which data can be efficiently and conveniently provided to a mobile terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a wireless communication unit configured to externally exchange a wireless signal, a display unit, and a controller, if a text message is received via the wireless communication unit, determining whether application update information for updating information of a specific application is included in the received text message and whether an indictor indicating a type of the specific application is included in the received text message, the controller, if the indicator is included, updating information of an application of the type indicated by the indicator, the controller controlling the updated information to be displayed on the display unit.

In another aspect of the present invention, a mobile terminal includes a wireless communication unit configured to externally exchange a wireless signal, a controller including a text message module configured to process a text message and a widget module configured to control at least one widget application, and a display unit. In this case, if a text message is received via the wireless communication unit, the controller determines whether application update information for updating information of a specific application is included in the received text message and whether an indictor indicating a type of the specific application is included in the received text message. If the indicator is included, the controller updates information of an application of the type indicated by the indicator. And, the controller controls the updated information to be displayed on the display unit.

In another aspect of the present invention, a method of updating application information in a mobile terminal includes the steps of receiving a text message from a text message server via a wireless communication unit, determining whether the text message includes application update data, and if the text message includes the application update data as a result of the determining step, updating information of a corresponding application using the application update data.

In another aspect of the present invention, a wireless communication system includes a plurality of contents server generating source data, a service server generating application update data of a text message format by being provided with the source data from a plurality of the contents servers, a text message server making a request for the application update data to the service server, the text message server receiving the application update data from the service server, and a mobile terminal updating at least one of an application status and display information by receiving the application update data via a text message from the text message server.

In a further aspect of the present invention, a method of updating application information in a mobile terminal includes the steps of generating source data from a contents server responsible for a preset category, generating application update data of a text message format from a service server by obtaining the source data from the contents server, obtaining, by a text message server, the application update data from the service server, transmitting the obtained application update data to the mobile terminal from the text message server via a text message, receiving, by the mobile terminal, the text message, and updating, by the mobile terminal, application information related to the category using the application update data included in the received text message.

Accordingly, the present invention provides the following effects and/or advantages.

First of all, a mobile terminal according to at least one embodiment of the present invention is able to request and receive data for updating information displayed on an application via a text based message service.

Secondly, a terminal is able to efficiently update application information using a mobile communication system according to at least one embodiment of the present invention.

It is to be understood that both the foregoing general description and the following detailed description of the present invention are exemplary and explanatory and are intended to provide further explanation of the invention as claimed.

A mobile terminal according to an aspect of the present invention includes a wireless communication unit configured to externally exchange a wireless signal, a display unit, and a controller, when a text message is received from a text message server via the wireless communication unit, configured to determine whether application update data for updating information of a specific application is included in the received text message and whether an indictor indicating a type of the specific application is included in the received text message, to update the information of the specific application indicated by the indicator if the indicator is included in the received text message, and to control the updated information to be displayed on the display unit.

In a further aspect of the present invention, a method of updating application information in a mobile terminal includes receiving a text message from a text message server via a wireless communication unit, determining whether the text message includes application update data, and if the text message includes the application update data, updating information of a corresponding application using the application update data.

A mobile terminal according to an aspect of the present invention includes a plurality of contents servers configured to generate source data, a service server configured to generate application update data of a text message format using the source data, wherein the plurality of the contents servers provide the service server with the source data, a text message server configured to request the application update data to the service server, the text message server receiving the application update data from the service server, and a mobile terminal configured to update at least one of an application status and display information according to the application update data via a text message received from the text message server.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
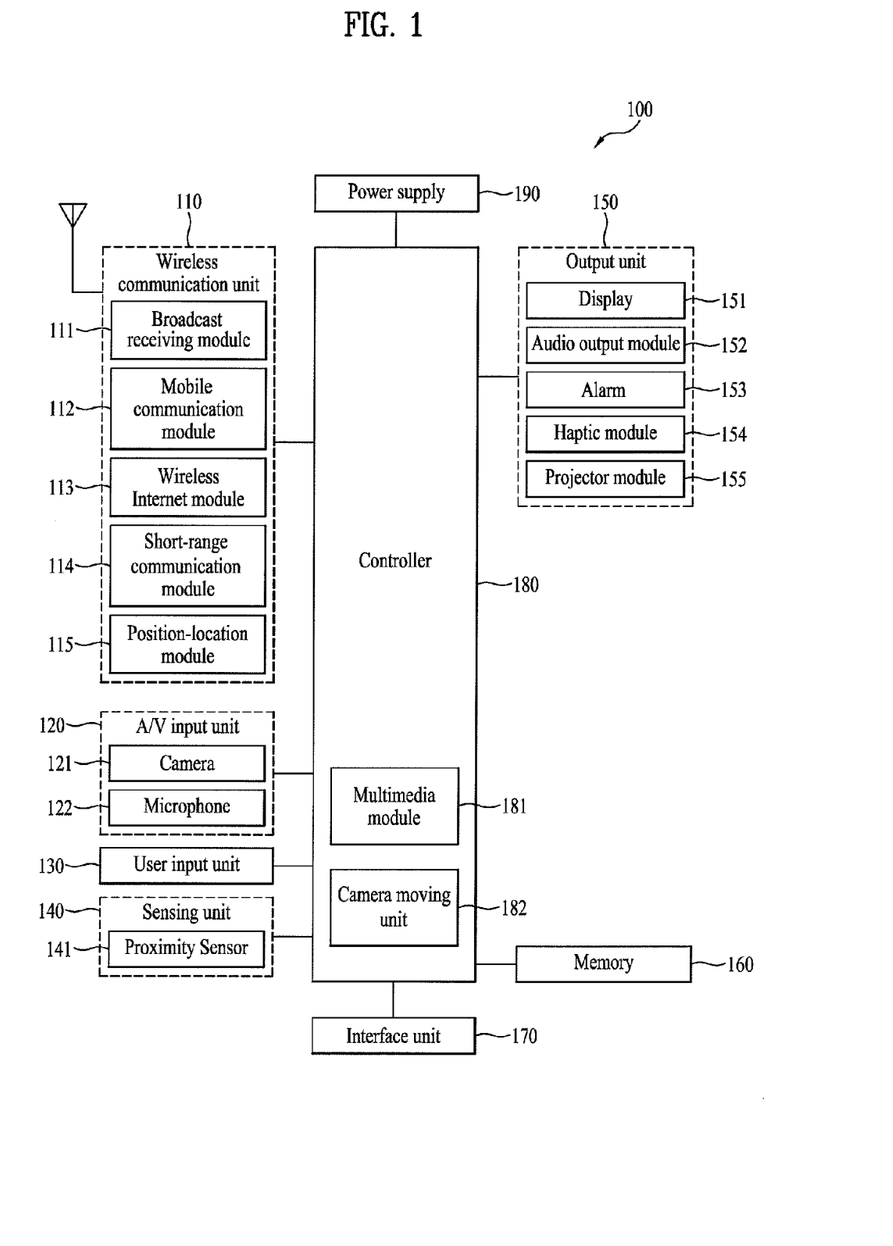
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
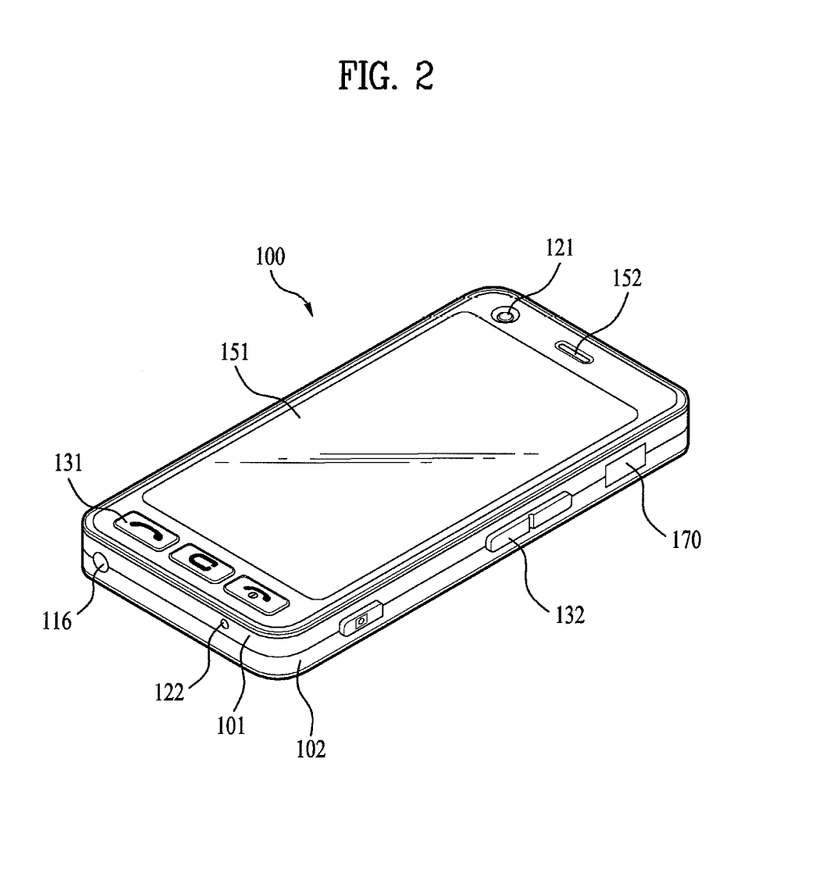
FIG. 2 is a front perspective diagram of a mobile terminal according to one embodiment of the present invention.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

For clarity and convenience of the following description, a mobile terminal mentioned in the following description is assumed as including at least one of the components shown in FIG. 1.

Various applications are executed and displayed on the display unit of the mobile terminal according to one embodiment of the present invention under the control of the controller 180. And, at least two or more applications can be simultaneously executed. Thus, some of the applications executable in the mobile terminal can provide a user with information in a manner of updating a current status or displaying new information by receiving information externally via the wireless communication unit 110. For example of such an application, there is widget. The widget includes a service tool group that enables a user to collectively view various functions that are gathered at one side of a wallpaper. In this case, the various functions include memo-, weather-, calendar-, schedule management-, watch-, notice-, stock price-, interest rate-, and text-based instant messengers. Hence, the user is able to select and use a necessary one of the various functions. Such a widget as a watch widget, a calendar widget and the like does not require an update once it is set by a user. On the contrary, such a widget as a weather widget, a news widget and the like needs to be updated frequently, in a prescribed period, or by real time.

In order to update the information provided to a user via the widget, various means are available. For instance, a recently released smart phone provides a wireless internet (WLAN or Wi-Fi) function to facilitate data transceivings via Internet or is able to perform high-speed data packet transmission using a 3G or HSUPA/HSDPA function. Yet, the above-mentioned functions are implemented in a relatively expensive mobile terminal. In case of Wireless Internet, coverage is narrow to have spatial limitation that requires an accessible access point (AP) nearby. Moreover, it is disadvantageous in that the data packet service is an expensive service. Accordingly, the demand for a method and apparatus for transceiving application data such as a widget in a simpler and more efficient manner, which can be implemented in a general mobile terminal as well as an expensive/high-spec. mobile terminal is ongoing to rise.

The following description is made centering on a widget application for clarity and convenience. Moreover, the present invention applicable applications are non-limited by the widget. Alternatively, the present invention is applicable to every application capable of updating display information or status with data received via a wireless communication module. Moreover, in the following description, the data for updating the status or display information of a widget application shall be named 'widget update data' for clarity.

Text Message Based Widget Update Data

One embodiment of the present invention proposes to use a text message of a specific format to transceive widget update data. In this case, the text message means a text based data including a short message service (SMS) basically provided together with a voice call function through a mobile communication service provider in a general mobile communication system.

System Configuration

In the following description, a system configuration, in which embodiments of the present invention can be performed, is explained with reference to FIG. 3.

Figure 3:
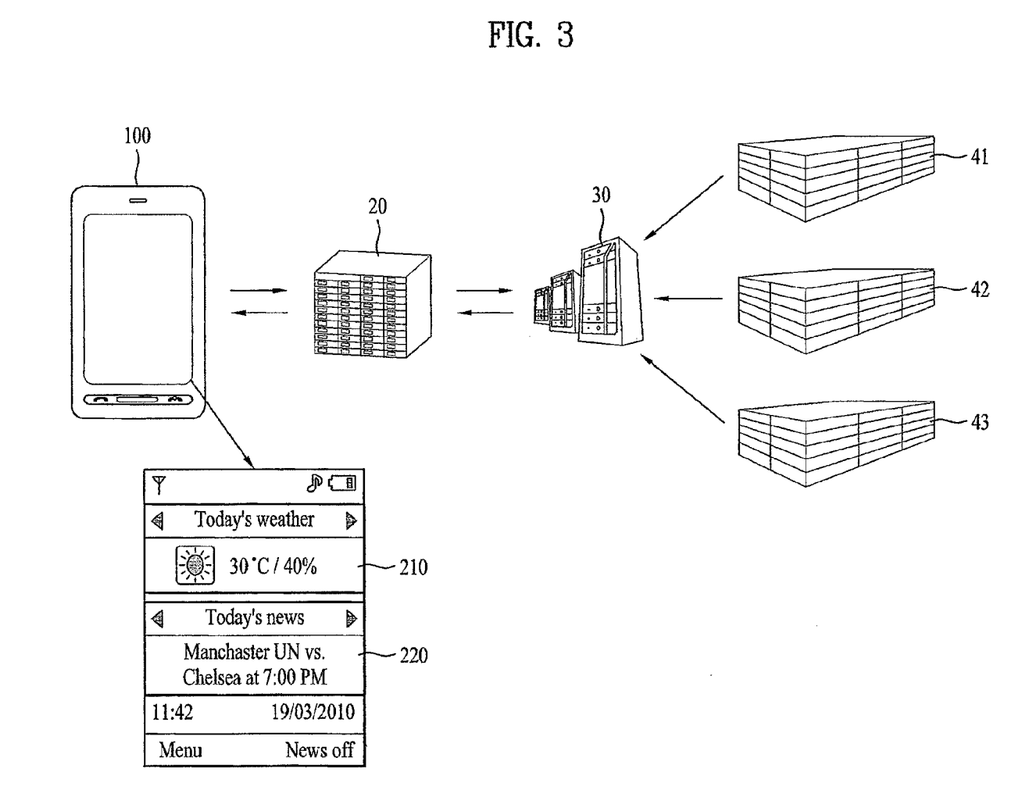
FIG. 3 is a diagram for one example of a system configuration for implementing application data transceivings using a text message according to one embodiment of the present invention.

FIG. 3 is a diagram for one example of a system configuration for implementing application data transceivings using a text message according to one embodiment of the present invention.

Referring to FIG. 3, a system configured to implement application data transceiving using a text message according to one embodiment of the present invention includes a mobile terminal 100, a text message server 20, a service server 30 and a plurality of contents providing servers 41 to 43.

First of all, a configuration of the mobile terminal 100 is identical to that in the former description described with reference to FIG. 1 and FIG. 2 and preferably includes the wireless communication unit 110 and the display unit 151. In particular, the wireless communication unit 110 should include the mobile communication module 112 configured to transceive a text based message. A widget application is displayed on the display unit 151 (e.g., a wallpaper, a basic standby image, etc.). In FIG. 3, a weather widget 210 and a news widget 220 are displayed together. Thus, at least two widget applications can be simultaneously executed.

The text message server 20 is able to exchange a text message of a prescribed format with the mobile terminal 100. The text message server 20 is able to be provided with a data of a text message format by the service server 30. And, the text message server 20 is able to make a request for the data of the text message format to the service server 30.

The service server 30 is provided with information (hereinafter named source data for clarity) for generating the widget update data by a plurality of the contents providing servers 41 to 43, converts the provided information according to a format for a text message (i.e., converts the provided information to the widget update data), and is then able to store the widget update data. The stored widget update data can play a role in providing the corresponding widget update data to the text message server 20 periodically. The stored widget update data can play a role in providing the corresponding widget update data to the text message server 20 each time source data is provided by the contents providing server or if a request is made by the mobile terminal 100 via the text message server 20.

The contents providing servers 41 to 43 conceptionally include all entities capable of providing the source data for the widget update data. For example, the contents providing servers include a server configured to provide service contents dedicated to widgets, a news related website server, an RSS server configured to inform a subscriber of such a new material or data as a general web blog, a news article, a blog posting, a music clip, a video clip and the like when the new material or data is uploaded to a website. When information is updated in the contents providing server or if there is periodically updated information, the contents providing server is able to immediately transmit the updated information to the service server 30.

Format of Text Message

In the following description, a method of discriminating a text message including widget update data according to one embodiment of the present invention from a general text message is explained.

First of all, a text message can be mainly divided into a header and a body. And, each of the header and the body can include various fields. Generally, a content of a message (e.g., SMS message) viewed by a user via the display unit 151 is the information included in one of the fields constructing the body. The header includes a field indicating a message type, a field indicating a length of a corresponding message, and the like. And, the body includes a field indicating an originator number, a field indicating a service provider identity code, a field containing a text content, and the like. The above-described field configuration is not stationary but can be changed according to a communication service provider or an applicable communication standard.

In order to discriminate a text message including widget update data according to one embodiment of the present invention from a general text message, one of the following methods can be used using various fields configuring the text message. First of all, in a first method 1), new parameters are defined in at least one of the fields to indicate the widget update data. In a second method 2), a 1-bit indicator field indicating whether the widget update data is included is newly defined. In a third method 3), a character string of a prescribed format is added to a text field. In a fourth method 4), a text message including the widget update data can be identified using a specific originating number. In this case, the widget update data preferably includes an identifier (ID) for identifying a widget to update.

If a text message is sent by the text message server 20, the controller 180 of the mobile terminal 100 according to the present invention is able to determine whether the received text message includes widget update data using each field of the received text message by one of the above described methods. If the controller 180 determines that the received text message includes the widget update data, the corresponding message can be used to update display information or status of a widget instead of being forwarded to a message box. If a widget module for processing widget related information and a message module for processing a text message normally (e.g., a message box function, a message read function, etc.) are separately provided to the controller 180, the controller 180 forwards the text message determined as including the widget update data not to the message module but to the widget module.

In the following description, a detailed example of the method (e.g., the third method 3)) of adding the character string to the text field is explained with reference to FIG. 4.

Figure 4:
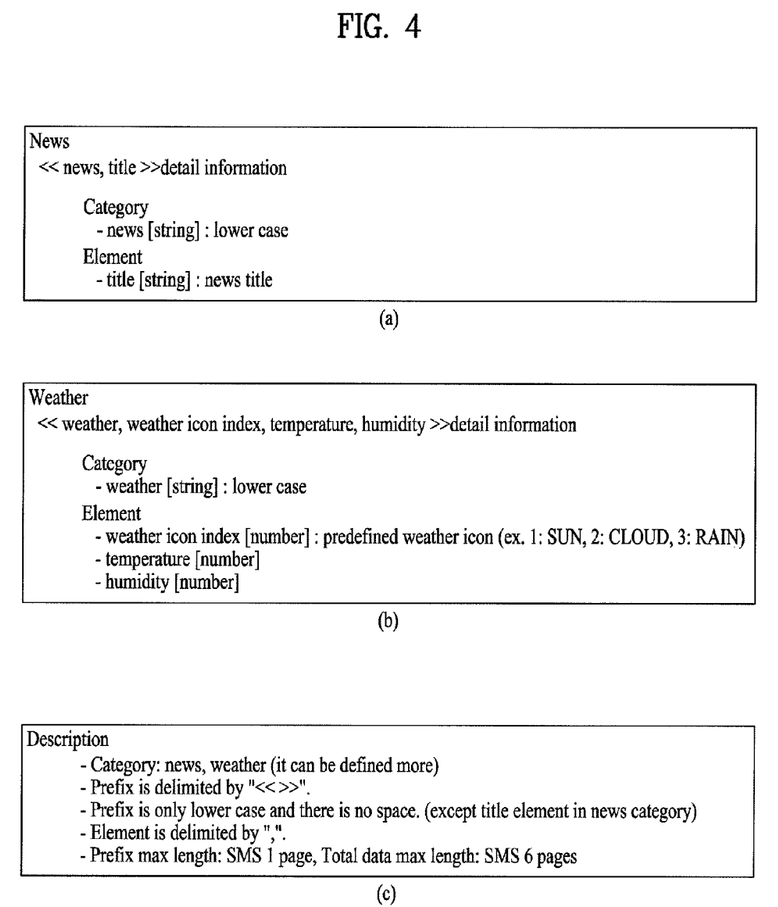
FIG. 4 is a diagram for one example of a character string indicating a widget update data according to one embodiment of the present invention.

FIG. 4 is a diagram for one example of a character string indicating a widget update data according to one embodiment of the present invention.

FIG. 4 (*a*) shows widget update data for updating a news widget. FIG. 4 (*b*) shows widget update data for updating a weather widget. And, FIG. 4 (*c*) describes a usage of a character string. According to the character string shown in FIG. 4, a type of a widget, to which widget update data included in a corresponding message will be applied, and/or a field included in the corresponding message are enumerated in the double brackets. And, detailed data is included below the double bracket by being classified per field.

Setting & Manipulation of Widget

In the following description, a method of setting a widget according to the present invention is explained.

First of all, as mentioned in the foregoing description, a widget application can be displayed on a prescribed region of a wallpaper or a basic standby image on the display unit 151. And, at least two or more widget applications can be simultaneously displayed. Whether to activate such a widget can be set by a prescribed menu manipulation of a user via the user input unit 130. This is explained with reference to FIG. 5A and FIG. 5B as follows.

Figure 5A:
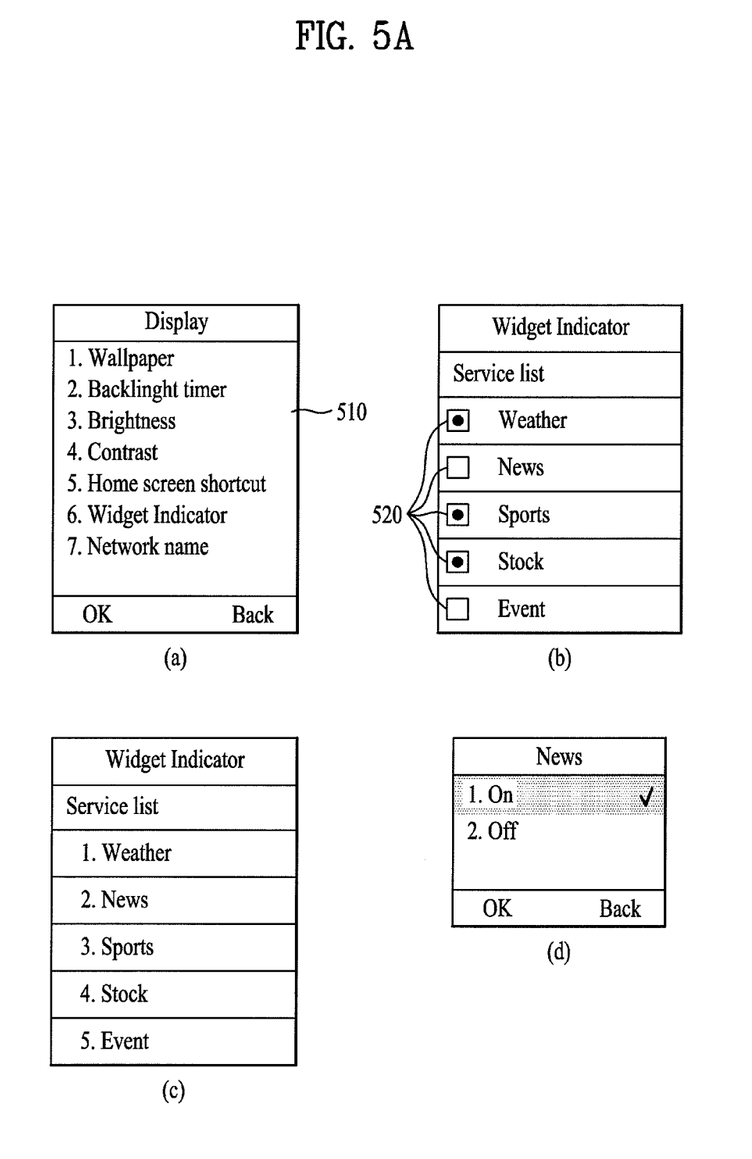
FIG. 5A and FIG. 5B are diagrams of display configurations indicating examples of a process for setting a widget application in a mobile terminal according to one embodiment of the present invention, respectively.
Figure 5B:
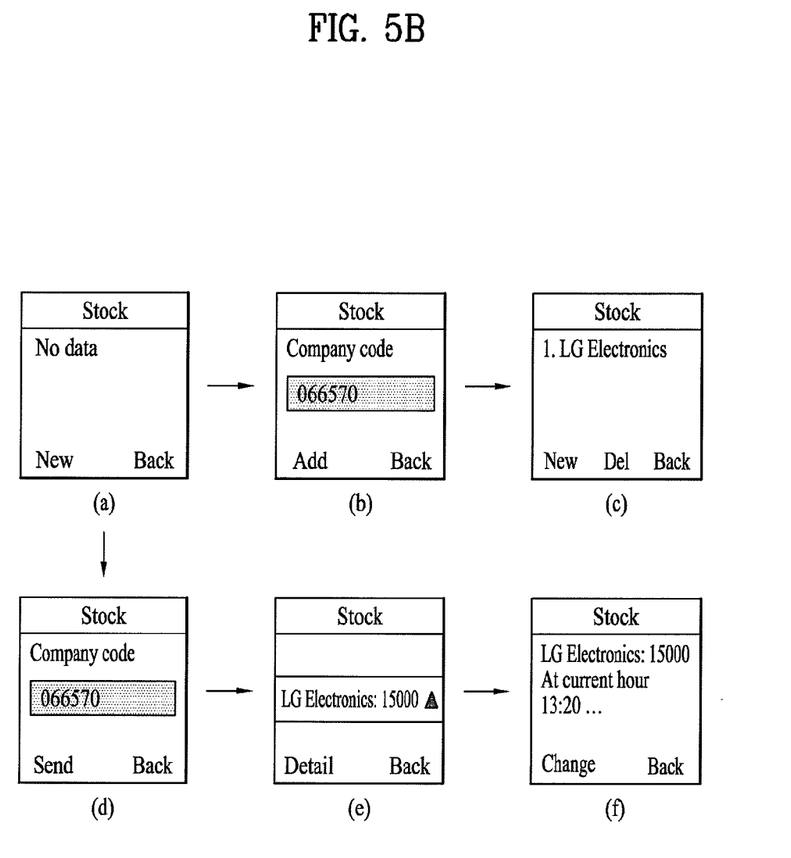

FIG. 5A and FIG. 5B are diagrams of display configurations indicating examples of a process for setting a widget application in a mobile terminal according to one embodiment of the present invention, respectively.

Referring to FIG. 5A, a user is able to select a menu for setting whether to display a widget on a standby image via such a prescribed menu manipulation as shown in FIG. 5A (a). FIG. 5A (a) shows that a widget setting menu 510 is a submenu of a display menu, which is just exemplary. Alternatively, a different menu hierarchy structure can be provided according to a mobile terminal.

Once the widget setting menu 510 is selected, a list of widgets is displayed as shown in FIG. 5A (b). And, whether to display each of the widgets can be changed via a check box 520 provided to next to one side the corresponding widget. Referring to FIG. 5A (b), it can be observed that weather, sports news and stock information widgets are set.

Unlike the check box using case shown in FIG. 5A (b), if the widget setting menu 510 is selected, such a widget list as shown in FIG. 5A (c) can be displayed only. In this case, a user selects a prescribed widget from the widget list and is then able to individually select whether to display each of the widgets from such a setting image as shown in FIG. 5A (d). In doing so, information on an update period can be set together (not shown in the drawing).

Once whether to use each widget is changed by the above method, the corresponding change information is transmitted to the text message server 20 via a text message of a specific format. The text message server 20 is then able to transmit the text message of the specific format to the service server 30. Subsequently, the service server 30 determines whether to transmit a prescribed widget update data to the corresponding terminal and/or determines a transmission period, by referring to the corresponding change information indicating whether the corresponding terminal uses a prescribed widget.

FIG. 5B shows a detailed setting method. FIG. 5B (a) shows a case that the #4 stock information is selected in FIG. 5A (c). In this case, it can be observed that an interested item of a user is not registered.

If a company code is inputted as shown in FIG. 5B (b), an interesting item list can be updated as shown in FIG. 5B (c). More items can be additionally registered with the interesting item list or a previously registered interesting item can be deleted. If the interesting item list is registered, the controller 180 is able to transmit information on the registered interesting item to the text message server 20 via the wireless communication module 110. The text message server 20 forwards the information to the service server 30. The service server 30 then transmits widget update data for the interesting item, which is updated periodically or each time the updated information on the corresponding interesting item is received from the contents server related to the stock information, to the text message server 20. And, the text message server 20 is able to transmit a text message including the corresponding widget update data to the mobile terminal 100 having requested the corresponding data.

Alternatively, instead of updating the interesting item list, current information on the corresponding item can be directly requested. FIG. 5B (d) shows a function connected in FIG. 5B (a) or a function displayed in case of selecting a stock information related widget from a standby image. If a company code corresponding to an interesting item is inputted, the widget update information on the corresponding item can be transmitted via the text message through the process described with reference to FIG. 3. And, the corresponding information can be displayed as shown in FIG. 5B (e). In this case, if a detail view menu is selected, detail information on the corresponding item can be displayed as shown in FIG. 5B (f).

A method of manipulating a widget according to the present invention is explained with reference to FIG. 6 and FIG. 7 as follows.

Figure 6:
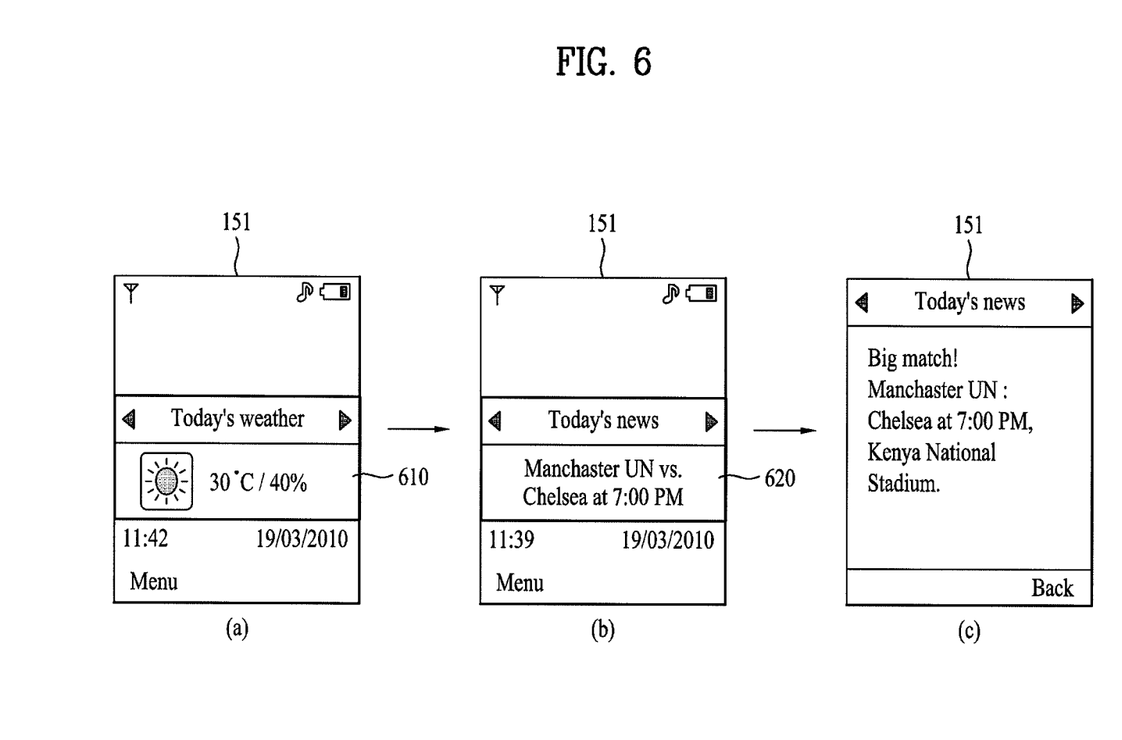
FIG. 6 is a diagram for one example of a widget manipulating method according to one embodiment of the present invention.

FIG. 6 is a diagram for one example of a widget manipulating method according to one embodiment of the present invention.

In FIG. 6, assume a case that one widget is displayed on a prescribed region of a basic standby image (e.g., a wallpaper) of a user only.

Referring to FIG. 6 (*a*), a weather widget 610 is displayed on a wallpaper of the display unit 151. In this case, a user is able to change a type of a widget displayed on the same region into a news widget 620, as shown in FIG. 6 (*b*), in a manner of manipulating a navigation key capable of inputs in at least four directions (e.g., top direction, bottom direction, left direction and right direction) or key buttons corresponding to the navigation key. If an OK key button or a corresponding key button is manipulated, detail information on the corresponding widget can be checked as shown in FIG. 6 (*c*). FIG. 6 exemplarily shows that the corresponding widget can be scrolled in left and right direction to change the widget. Alternatively, the corresponding widget can be scrolled in top and bottom directions.

Figure 7:
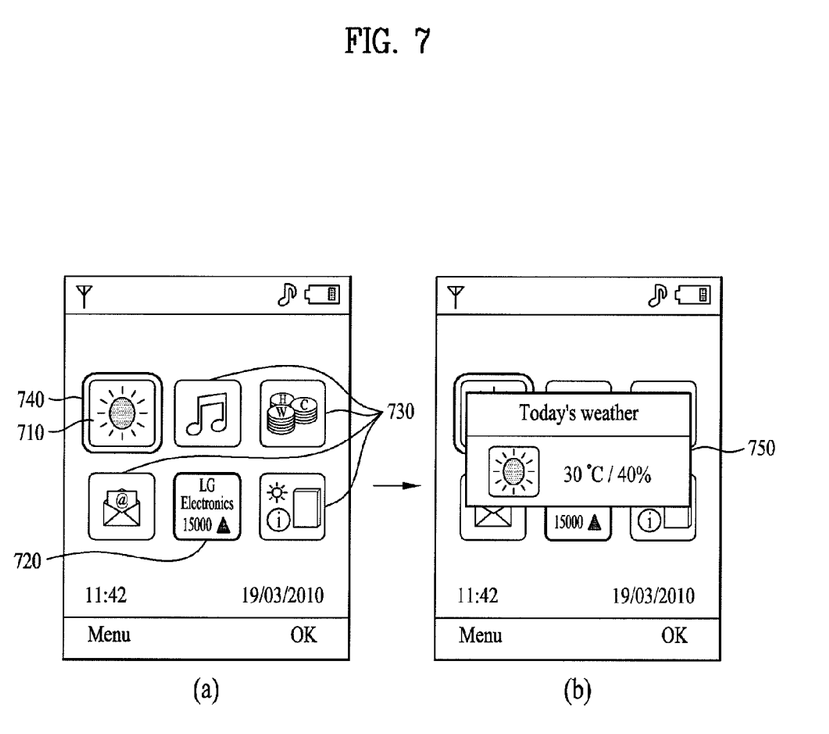
FIG. 7 is a diagram for another example of a widget manipulating method according to one embodiment of the present invention.

FIG. 7 is a diagram for another example of a widget manipulating method according to one embodiment of the present invention.

In FIG. 7, assume a case that a plurality of widgets of the same types of general menu icons are displayed on a user's basic standby image (e.g., a wallpaper).

Referring to FIG. 7 (*a*), a weather widget 710, a stock information widget 720 and other menu icons 730 are displayed on a wallpaper. In this case, a prescribed visual effect 740 (e.g., an outline in different color) indicating a currently selected icon or widget can be given.

A user is able to select an icon (i.e., change a position of an outline 740 by manipulating a navigation key or a corresponding key button or touching the corresponding icon in case of implementation with a touchscreen. While the weather widget icon 710 is selected, if the user inputs a selection command again, detail weather information 750 can be displayed as shown in FIG. 7 (*b*).

The above-described type, formation and manipulation of the widget are exemplary, by which the present invention is non-limited. Alternatively, the present invention is applicable to various types, formations and manipulations of widgets.

Priority Setting of Wireless Communication Module

Meanwhile according to another embodiment of the present invention, a priority of a wireless communication module can be set. In particular, according to one embodiment of the present invention, the widget update data is received via a text message using the mobile communication module 112 in the wireless communication module 110. In case that the wireless internet module 113 and/or the short-range communication module 114 is further provided to the mobile terminal 100 as well as the mobile communication module 112, the widget update data can be received via at least one of the further provided communication modules. In this case, a priority can be set to determine whether the widget update data will be received using a prescribed module. This is because Wireless Internet or short-range communication is free of charge according to a place or can transmit data faster than a text message.

Therefore, if the wireless internet or the short-range communication is available, it is able to manually set the widget update data to be received via the wireless internet or the short-range communication instead of the text message. If the controller 180 detects that the corresponding communication is available, it is able to automatically set the widget update data to be received via the wireless internet or the short-range communication instead of the text message.

In this case, in order to inform the service server 30 that the text message based widget update data for the corresponding mobile terminal 100 needs not to be transmitted, the controller 180 is able to send a text message to notice that the widget update data transmission will be automatically interrupted. Moreover, if the wireless internet or the short-range communication is not available, the controller 180 is able to control a text message for requesting another widget update data transmission to be sent to the service server 30.

It will be apparent to those skilled in the art that various modifications and variations can be specified into other form(s) without departing from the spirit or scope of the inventions.

According to one embodiment of the present invention, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a wireless communication unit configured to externally exchange a wireless signal;
a display unit; and
a controller configured to:
receive a text message from a text message server via the wireless communication unit,
determine whether the received text message is a widget update data text message including widget update data for updating a corresponding widget pre-installed on the mobile terminal or is a general text message not including the widget update data based on an indicator included in the received text message,
when the indicator indicates the received text message is the widget update data text message, forward the received text message to a widget module to update the corresponding widget with the widget update data are included in the received text message and not forward the received text message to a text message box, and
when the indicator indicates the received text message is the general update text message, forward the received text message to the text message box and not forward the received text message to the widget module,
wherein the text message comprises a short message service (SMS).

2. The mobile terminal of claim 1, wherein the text message server receives the widget update data from a service server, and the service server generates the widget update data of a text message format using source data generated from a plurality of contents servers.

3. The mobile terminal of claim 2, wherein the service server converts the source data corresponding to the widget update data of the text message format, stores the converted source data, and sends the widget update data to the text message server, periodically or by a request from the mobile terminal.

4. The mobile terminal of claim 2, further comprising:
a user input unit configured to receive an input command from a user,
wherein when a list including the corresponding widget requiring an update is input by the user via the user input unit, the controller transmits the text message including the list to the text message server to inform the service server of the list.

5. The mobile terminal of claim 2, wherein the wireless communication unit further comprises:
a wireless internet module; and
a short-range communication module, and
wherein the controller determines whether to use the wireless internet module or the short-range communication module for an information field update of the corresponding widget according to a preset priority.

6. The mobile terminal of claim 1, wherein the corresponding widget is displayed on a prescribed region of the display unit, and at least two or more widgets are displayed simultaneously.

7. A method of updating application information in a mobile terminal, method comprising:
receiving a text message from a text message server via a wireless communication unit of the mobile terminal;
determining, by a controller of the mobile terminal, whether the received text message is a widget update data text message including widget update data for updating a corresponding widget pre-installed on the mobile terminal or is a general text message not including the widget update data based on an indicator included in the received text message;
when the indicator indicates the received text message is the widget update data text message, forwarding, by the controller, the received text message to a widget module to update the corresponding widget with the widget update data included in the received text message and not forward the received text message to a text message box; and
when the indicator indicates the received text message is the general update text message, forwarding, by the controller, the received text message to the text message box and not forward the received text message to the widget module,
wherein the text message comprises a short message service (SMS).

8. The method of claim 7, wherein the determining step comprises:
determining whether the text message includes a specific character string indicating the widget update data.

9. The method of claim 7, wherein the determining step comprises:
determining whether the widget update data includes an indicator for identifying a specific widget to update.

10. The method of claim 7, wherein the text message server receives the widget update data from a service server, and the service server generates the widget update data of a text message format using source data generated from a plurality of contents servers.

11. The method of claim 10, wherein the service server converts the source data corresponding to the widget update data of the text message format, stores the converted source data, and sends the widget update data to the text message server, periodically or by a request from the mobile terminal.

12. The method of claim 7, further comprising:
registering, by a user, a list of widgets requiring updates via a user input unit; and
sending the text message including the list of widgets to the text message server to inform the service server of the list.

13. The method of claim 7, further comprising:
displaying the corresponding widget on a prescribed region of a display unit, wherein at least two or more widgets are displayed simultaneously.

14. A wireless communication system, comprising:
a plurality of contents servers configured to generate source data;
a service server configured to generate widget update data for updating a corresponding widget of a text message format using the source data, wherein the plurality of the contents servers provide the service server with the source data;
a text message server configured to request the widget update data to the service server, the text message server receiving the widget update data from the service server; and
a mobile terminal configured to:
receive a text message from the text message server via a wireless communication unit,
determine whether the received text message is a widget update data text message including widget update data for updating a corresponding widget pre-installed on the mobile terminal or is a general text message not including the widget update data based on an indicator included in the received text message,
when the indicator indicates the received text message is the widget update data text message, forward the received text message to a widget module to update the corresponding widget with the widget update data included in the received text message and not forward the received text message to a text message box, and
when the indicator indicates the received text message is the general update text message, forward the received text message to the text message box and not forward the received text message to the widget module,
wherein the text message comprises a short message service (SMS).

15. The wireless communication system of claim 14, wherein the service server converts the source data corresponding to the widget update data of the text message format, stores the converted source data, and sends the widget update data to the text message server, periodically or by a request from the mobile terminal.

* * * * *